United States Patent Office 2,865,882
Patented Dec. 23, 1958

2,865,882

ELASTOMERIC COMPOSITIONS HAVING SILICA-CONTAINING REINFORCING PIGMENT

Roger W. Strassburg, Cleveland, Ohio, assignor to The B. F. Goodrich Company, New York, N. Y., a corporation of New York No Drawing. Application December 22, 1955
Serial No. 554,648

23 Claims. (Cl. 260—41.5)

This invention relates to novel compounds comprising silicon and oxygen. In particular, the present invention pertains to fibrous compositions containing silicon and oxygen which are very useful as reinforcing pigments for elastomers, to organic polymeric compositions such as elastomers containing such fibrous compositions and to methods for making the same.

"Monox" or solid, particulate, disproportionated silicon monoxide $(SiO_2)_x \cdot (Si)_y$ where $x$ and $y$ are integers, is produced by the reaction of carbon and silica at high temperatures under reducing conditions, such as in an arc furnace, and allowing the gaseous reaction products containing SiO to condense in a partial or in an essentially complete vacuum or vacuum chamber or in an inert atmosphere or gas of nitrogen, argon, helium, CO, etc. In place of carbon, silicon or silicon carbide can be used to produce SiO gas. Alternatively, silicon metal can carefully be oxidized to SiO gas which then can be condensed. Still other methods for making monox can be used.

Monox is characterized as being solid, finely-divided or particulate and exhibiting under the electron microscope a mixture of spherical particles and fibrous particles. If the process is conducted in a manner that the inert condensing gas and the silicon monoxide gas stream mix together with little or no turbulence, especially long and tendrilous fibers are obtained. Moreover the amount of the nonfibrous particles is materially reduced and is less than the fibrous particles. In such process the inert condensing gas also should be essentially pure that is, it should contain only a few parts of an oxidizing gas per million parts of condensing gas, or if it is of a commercial variety containing a minor amount of oxygen or oxidizing gases, it should also contain a minor amount of an amine such as ammonia, ethyl amine and the like or a hydrogen-furnishing gas such as hydrogen itself, methane, ethane, etc. to remove any traces of oxidizing gas in the inert condensing gas as well as in the furnace gases. If desired, generally nonfibrous monox can be obtained by merely blowing the silicon monoxide gas stream from the furnace with any of the above inert condensing gases, or gas mixtures, to cause turbulence in the mixing gas streams. The monox may contain minor amounts of nitrogen, usually about 1–8% by weight of bound nitrogen probably as $(SiONH)_x$, $x$ being an integer, i. e.,

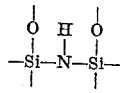

where the nitrogen is attached to two silicon atoms within the silica lattice so that part of the Si is tied up, if the inert condensing gas was nitrogen and if it also contained from about 0.5 to 9% by volume of a gaseous amine. However, very little (less than 1% by weight) or no nitrogen is present in the monox if a pure inert condensing gas is used or a commercial variety of inert gas containing a hydrogen furnishing gas is used and the silica and carbon used are very pure. The latter described monox effects a less rapid cure in rubber containing compositions due to its greater acidity.

In general, the fibers of the fibrous type of monox have a ratio of length to width of from about 10:1 to 50:1 or greater and exhibit a surface area of from about 60 to 200 square meters per gram although the surface area may be smaller or larger. Their average length will vary from about 50 to 600 millimicrons or higher. The nonfibrous particles, if any, in the mixture may have an average particle size of from about 5 to 200 mu and a surface area of from about 200 to 300 m.²/g. When the SiO gas is blown with an inert gas, the generally nonfibrous particles obtained have a surface area of from about 200 to 300 m.²/g. and a random range of particle sizes of from about 5 to 200 mu.

Although the nonfibrous forms of monox reinforce elastomers to some extent, fibrous or substantially fibrous monox, particularly where the fibers are very long and the ratio of the length to the width of the fibers is high, is very useful as reinforcing pigment for various elastomeric products such as rubber, vinyls, polyesterurethanes and the like. However, monox is brown, and, accordingly, the color of the products produced with it are brown. This color can not be masked by the use of color pigments without using a large amount of the color pigment to reduce materially the reinforcing properties imparted by the monox.

It has been found that monox can be treated with a halogen gas or with a mixture of a halogen gas and an oxidizing gas, for example, chlorine gas or chlorine and oxygen gases, to obtain a light colored to white, amorphous silica product having essentially the same physical form and particle size as exhibited by the original brown monox but containing up to about 3% by weight of halogen and being essentially free of silicon. The halogenated monox may also contain part of the bound nitrogen, $(SiONH)_x$, originally present in the monox. The halogenated product may have a larger surface area than the original monox. It may also contain more silicon dioxide than the original monox depending on the amount of oxidizing gas used with the halogen gas and the extent of the treatment. Methods for obtaining such product by halogenating or halogenating and oxidizing monox are disclosed in copending patent application of Roger W. Strassburg, entitled "Compositions and Methods for Making the Same," Serial No. 554,614, and filed of even date herewith. This halogenated monox, however, is not directly useful as a reinforcing pigment in elastomeric compositions due to the amount of halogen contained therein which apparently prevents the obtainment of optimum physical properties in the finally produced elastomeric product although it does not adversely affect the color of the elastomer. On the other hand, the product of such halogenation process is light colored to white and, when fibrous or substantially fibrous monox was used as the starting material, it retains the structure of such monox. Hence, it would be highly desirable to provide a method for treating this light colored to white halogenated monox to retain the benefit to the particle size and structure of the original monox and to improve its reinforcing properties so that it could be employed in making reinforced, light colored to white elastomeric compositions, in making variously colored, reinforced elastomeric compositions, or in making reinforced elastomeric compositions without adversely affecting the original color of the elastomeric compositions.

It, therefore, is a primary object of the present invention to provide a method for overcoming the difficulties alluded to above and to obtain a light colored to white reinforcing derivative of halogenated disproportionated silicon monoxide.

It is another object of the present invention to provide a method for obtaining an essentially halogen-free, light colored to white, fibrous and/or non fibrous, solid silica containing reinforcing material.

Yet another object is to provide an essentially halogen-free, light colored to white, fibrous and/or nonfibrous, solid silica containing composition particularly useful as a reinforcing pigment for organic polymeric and elastomeric materials.

A further object is to provide a method for reinforcing an elastomeric or organic polymeric material using an essentially halogen-free, light colored to white, fibrous and/or non-fibrous, solid silica containing composition.

A still further object is to provide an elastomeric or organic polymeric material reinforced with an essentially halogen-free, light colored to white, fibrous and/or non-fibrous, solid silica composition.

These and other objects and advantages of the present invention will become more apparent to those skilled in the art from the following detailed description and examples.

It has now been discovered according to the present invention that treatment of halogenated monox, or the light colored to white halogen containing fibrous and/or non-fibrous, particulate, amorphous silica obtained by halogenating one of the monoxes mentioned above with a halogen gas or a halogen-oxidizing gas mixture, with a nitrogen compound will serve to remove all or essentially all of the halogen contained in the silica with retention of its color, particle size, surface area and structure if fibrous and/or non-fibrous so that the silica can be used to obtain optimum physical properties in the elastomeric materials in which it is incorporated as well as to obtain light colored to white or variously colored elastomeric materials. The new silica reinforcing pigment contains a minor amount of nitrogen in an amount generally chemically equivalent to the halogen replaced and can be represented by the following formula:

$$\left\{\left[a-(m+n+p)\right]SiO_2+m\left[SiO_{3/2}+\frac{1}{v}(-NRR)\right]+\right.$$
$$\left.n\left[SiO+\frac{2}{v}(=NR)\right]+p\left[SiO_{1/2}\frac{3}{v}(\equiv N)\right]\right\}$$

where $a$ = total number of $SiO_2$ groups before reaction of the nitrogen compound with the halogenated silica, $m$ = number of $SiO_2$ groups with 1 valence link to NRR groups, $n$ = number of $SiO_2$ groups with 2 valence links to NR groups, $p$ = number of $SiO_2$ groups with 3 valence links to N groups, $v$ = the number of valence links of NRR, NR and N groups attached to silica, $m+2n+3p$ is divisible by $v$ $\frac{m+2n+3p}{v}$ = number of NRR, NR and N groups and R is hydrogen, an organic radical or $$\begin{array}{c}-N-R_1\\|\\R_1\end{array}$$

where $R_1$ and $R_1$ are hydrogen or organic radicals. The silica lattice containing the nitrogen compound added by the method of the present invention may also be represented by the following formula:

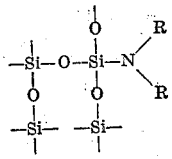

or $(SiONRR)_x$ in which $x$ is an integer. The

group also advantageously confers some alkalinity on the silica pigment so that it cures faster in elastomers.

The nitrogen compound should readily remove all or essentially all of the halogen contained in the silica or should combine with or react with the halogen of the silica to form a halogen compound or complex which is removed simultaneously or can be removed readily by subsequent treatment without adversely affecting the color or use of the silica pigment as a light colored to white pigment in elastomeric materials, the particle size, surface area or structure of the silica or the reinforcing function of the silica in elastomers. The nitrogen compound to be used in practice of the method of the present invention should have active hydrogen in order to readily react with the halogen of the silica to provide a halogen product, compound, salt, etc., which can be removed readily from the silica without adversely affecting the chemical and/or physical properties of the silica. The class of suitable nitrogen compounds includes ammonia, hydrazine, primary and secondary aliphatic, aromatic, cyclic and mixed aliphatic-aromatic, aliphatic-cyclic and aromatic-cyclic, straight chained or branched, saturated or unsaturated, amines, diamines, and the like, and similar organic hydrazine compounds and their substituted and N-substituted derivatives in which at least one of the organic groups of the amine or hydrazine can contain an ester, ether or imino linkage, can be nitrated or halogenated, or can have a terminal hydroxyl, carboxyl, oxo, alkoxy, phenoxy, or similar group, and so forth. Still other compounds can be used such as urea, guanidine, hydroxylamine, semicarbazides, semicarbazones and their substituted derivatives and the like. Specific examples of some of the nitrogen compounds which are useful are ammonia, hydrazine, phenyl hydrazine, methyl hydrazine, 1,2-diphenyl hydrazine, 1-ethyl-2-phenyl hydrazine, methyl amine, ethyl amine, propyl amine, butyl amine, amyl amine, aniline, benzyl amine, dimethyl amine, diethyl amine, diphenyl amine, N-butyl aniline, 1,2-ethanediamine, cyclohexylamine, N-methyl cyclohexylamine, B-ethoxyethylamine, o-chloroaniline, o-aminophenol, amino acetic acid, 3-aminobutanoic acid, methyl aminoethanoate, o-amino acetophenone, 2-amino-2-methyl-1-propanol, hydroxylamine, methylhydroxylamine, urea, 1-phenyl-semicarbazide, guanidine and the like. The nitrogen compound, thus, can have the formula NRRR in which R, R and R are selected from the group consisting of hydrogen, organic and $-NR_1R_1$ radicals, where $R_1$ and $R_1$ are selected from the group consisting of hydrogen and organic radicals, at least one R radical being hydrogen. The preferred compounds as to ease of applicability and results obtained are ammonia and the primary and secondary organic aliphatic, aromatic and cyclic organic amines and their substituted and N-substituted derivatives and should also be of relatively lower molecular weight so as to contact and readily remove the halogen atoms. Mixtures of the nitrogen compounds can also be employed.

The nitrogen compounds are employed in an amount at least sufficient to remove all or essentially all of the halogen contained in or on the silica. If any residual halogen remains in the silica, it is insufficient to adversely affect the reinforcing properties of the silica or the properties exhibited by elastomers reinforced with the silica. In general, it is necessary to use at least two mols of the nitrogen compound for every mol of halogen contained in the silica to carry the reaction forward and, preferably, to use an excess of the nitrogen compound in order to insure essentially complete conversion and removal of the halogen product from the silica as a salt, complex, or compound and to physically aid in freeing the silica of the halogen product by extracting the halogen product from the silica.

The halogen containing silica can be treated with the nitrogen compound in the solid, liquid or gaseous state. However, it is preferred to treat the silica with the nitro-

gen compound in the gaseous state since it is easier to control operations and it is unnecessary to remove residual liquids or solids at the end of the treating step. Also a halogen containing silica treated with a dry, gaseous nitrogen compound is easier to handle or disperse in the elastomeric material. Moreover, by using a gas it is not necessary to subsequentially remove any salt produced or to react it with alkali or other material and then extract or wash and filter. Accordingly, operations are considerably facilitated and easier to control by utilizing a nitrogen compound in the gaseous state.

When using a nitrogen compound in the gaseous state, it should be heated at a temperature sufficient to gasify or vaporize it and to increase its activity so that it will readily react with the halogen contained in the silica. Moreover, the temperature should be at least sufficiently high to remove the products of the reaction, whether a salt, compound or complex of the halogen, from the silica as a gas or vapor so that it will not be necessary to further treat the silica at higher or other temperatures or with solvents, alkali or other materials to remove the halogen product.

The temperature of reaction can be as low as room temperature or even lower although usually elevated temperatures of up to 400° C. and higher are used. Preferably, the temperature employed will be in the range of from about 700 to 800° C. where the reaction proceeds at the best rate. On the other hand, the reaction temperature should not be allowed to go too high to sinter or fuse the particles of the silica or to decompose the nitrogen compound to produce products which will not remove halogen from the silica. Although silica melts at about 1470° to 1700° C., the fine particles of the silica due to their small size and high surface area may tend to fuse and sinter at lower temperatures. Accordingly, it is preferred that the reaction temperature not exceed about 1100° C. at which temperature no sintering is observed. It will be noted that sintering causes a loss in the fibrous particles and a growth in the non fibrous particles which reduces the reinforcing ability of the resulting pigment in elastomers.

The rate of flow of the gaseous nitrogen compounds used or the time of reaction will vary with the amount of halogen containing silica used, the degree of packing of the silica in the apparatus employed, the type of apparatus used, the amount of agitation, the amount and kind of nitrogen compound employed and the degree of halogen removal desired.

The halogen containing silica can be treated with the nitrogen compound in an open vessel, in a pressure vessel or in a tube. An inclined rotary kiln in which the halogen containing silica flows downward counter-currently to the upward flow of the nitrogen compound can be employed for production purposes. However, concurrent flow as well as methods and apparatus using fluidized beds, stationary or moving, can also be used. Still other apparatus and methods for treating the solid, halogen containing silica with nitrogen compounds can be used.

The halogen-free silica pigment of the present invention can also be treated with steam at elevated temperatures if desired to remove the nitrogen contained in the pigment. However, the pigment containing nitrogen introduced during the treatment with the nitrogen compound exhibits a higher alkalinity than one free of nitrogen and will cure faster in certain elastomer formulations.

It is not precisely known what occurs when the halogen containing silica is treated with the nitrogen compound as disclosed herein to provide an increase in the nitrogen content of the silica and a reduction in or an elimination of the halogen contained therein. However, it is believed that as a result of halogenation, halogen atoms are adsorbed on or attached to the surface of the silica particles and may even form a compound with the silicon of the silica since the halogen atoms appear to be rather firmly secured to the silica particles and cannot readily be removed by merely heating. It is believed that the halogen atom is attached to the silica lattice as follows:

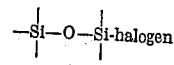

When the halogenated silica is treated with a nitrogen compound, the nitrogen compound reacts with the halogen to form a halogen compound and a residue of the nitrogen compound replaces the halogen on the silica. It is believed that the reaction proceeds as follows when ammonia is used and the silica contains chlorine from chlorine treated "monox":

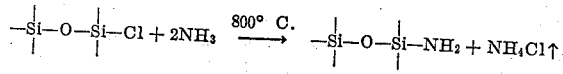

Moreover, if chlorine atoms are on the same or adjacent silicon atoms, the reaction may proceed as follows:

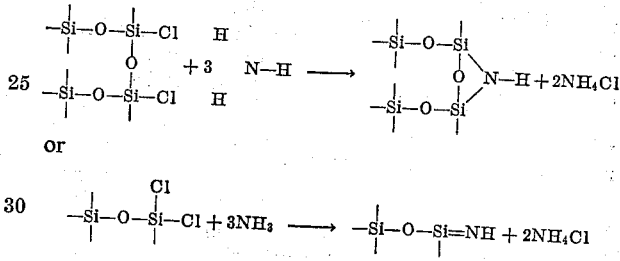

At the temperature employed and using a stream of ammonia gas, ammonium chloride will form and readily gasify or sublime from the silica to free it of chlorine as ammonium chloride. On the other hand as the chlorine is removed an $NH_2$ radical attaches to a terminal silicon atom in the silica lattice in an amount generally equivalent to the chlorine removed. Since the monox is already in the solid state, part of the chlorine attaches to the $SiO_2$ groups of the original "monox" through terminal silicon bonds while the remaining chlorine removes silicon as $SiCl_4$. When the chlorinated silica is subsequently treated with ammonia, a residue of the ammonia replaces the chlorine to form an $NH_2$ group attached to the silica in substantially the same way in which the chlorine was attached. It cannot readily be removed by heat alone. Thus, the treated silicas of the present invention now contain new nitrogen groups of the same or other silica lattice where the nitrogen is attached to a terminal silicon atom or may join together one or more silicon atoms, and the groups confer new properties on the pigment. Moreover, when the nitrogen compound used was an organic material, such as a primary or secondary amine, the new groups may have certain organic radicals in place of the hydrogen atoms. These radicals may aid in dispersing the pigment in elastomers and may cure with the elastomer if the radical contains a functional group such as —COOH, —OH, and so forth. Some condensation or cross-linking of the radicals also may occur to either form a coating on the silica particles or to more securely bind the silica particles to each other to increase fiber lengths or structure and to aid further in improving the properties which the silica particles impart to elastomers. Furthermore, when the radical of the nitrogen compound contains functional groups part of these groups may be attached directly to the silica surface. However, whatever may be the true nature in which the residue of the nitrogen compound is attached to the silica, it has been found that silicas containing such residues can be used to provide light colored to white or even variously colored reinforced elastomers. Thus, the treatment of the halogenated silica pigment with a nitrogen compound not only removes the halogen contained in the pigment but also aids in the production of silica pigments useful in producing light colored to white reinforced elastomeric products.

The essentially halogen-free, fibrous and/or non-fibrous, particulate, amorphous silica pigments of the present invention can be used directly as reinforcing pigments in elastomeric compounds, or can be coated with various materials such as alcohols, amines, silicone resins, etc., to further change the surface condition of the pigment before incorporation into the elastomers. While this invention has been described with particular reference to treatment of the halogenated brown fibrous or substantially fibrous monox which affords the greatest improvement in the reinforcement of elastomeric products, particularly rubber, it is apparent that the above remarks will apply to the treated halogenated brown non fibrous and/or spherical form of monox which reinforces to a lesser degree but which is still useful as a loading material, filler and so forth in various elastomers. Moreover, the light colored to white halogen-free pigments prepared by the method of the present invention are not only useful in elastomers but also are useful in organic polymeric compositions generally such as in thermoplastics and thermosetting plastics, in hard rubbers, in rigid vinyls, in resins, as well as in ceramic compositions, in insulating compositions, lubricants, etc.

Examples of elastomeric materials which can be used with these pigments are natural and synthetic vulcanizable rubbers such as natural rubber, which is essentially a polymer of isoprene, balata, gutta, percha, and the rubbery polymers of open-chain conjugated dienes, dienes especially having from 4 to 8 carbon atoms such as butadiene-1,3, isoprene, 2-3 dimethyl butadiene-1,3, 2-chlorobutadiene-1,3 and the like, or the rubbery copolymers, terpolymers and the like of these and similar conjugated dienes with each other or with at least one copolymerizable monomeric material such as isobutylene, styrene, acrylonitrile, methyl acrylate, ethyl acrylate, butyl acrylate, methyl methacrylate, 2-vinyl pyridine, etc. The polymeric diene elastomers generally contain at least 50% by weight of the diene and preferably contain from about 55 to 85% by weight of the diene. However, copolymers, terpolymers and other multicomponent polymers containing as little as 35% or less by weight of diene can also be employed. For example, polymers of about 35% by weight of butadiene-1,3, about 35% styrene and about 30% acrylonitrile and of about 97% isobutylene and about 3% isoprene can be used. Still other polymeric materials can be used such as the polymers and copolymers of styrene, vinyl chloride, vinyl chloride-vinylidene chloride, vinyl chloride-vinyl acetate, vinylidene chloride, isobutylene, and so forth. Moreover, there can be used polymers having curable acid groups and formed by the polymerization of a major amount of an open-chain aliphatic conjugated diene and an olefinically unsaturated carboxylic acid, by the reaction of a polymer of a diene with a carboxyl supplying reagent preferably in the presence of a catalyst, by copolymerization of a diene with an olefinically unsaturated copolymerizable compound hydrolyzable to form an acid group, by copolymerization of an alkyl ester of an acrylic type acid with an olefinically unsaturated carboxylic acid, by hydrolysis of an alkyl ester of acrylic acid or by copolymerization of a major amount of a monoolefin or isoolefin with a copolymerizable compound hydrolyzable to form groups containing bound —COOH. Still other polymers can be employed such as those formed by the copolymerization of dienes with alkyl acrylates, by the polymerization of alkyl acrylates alone and by the polymerization of an alkyl acrylate with at least one other olefinically unsaturated monomer which then are hydrolyzed to obtain curable —COOH groups. In place of polymers having COOH groups, polymers having groups such as COOR, COCl, CN, $CONH_2$, $COONH_4$ and COOMe, where Me is a metal, and the like and which are convertible to COOH groups by ammonolysis, hydrolysis, or similar reaction, for example, by treating such polymers with dilute mineral acids, HCl or $H_2SO_4$, or concentrated or preferably dilute KOH or NaOH, can also be employed after such groups have been converted to a curable COOH group. Polymers having $SO_3H$, $SO_2H$ or $PO_3H_2$ groups, or other acid groups, or derivatives thereof convertible to the free acid on hydrolysis and which likewise can be cross-linked, cured or vulcanized can also be used. Polymeric vulcanizable synthetic rubbers formed by the polymerization of an acrylic acid ester, for example, ethyl acrylate or butyl acrylate, or mixtures of acrylic acid esters or by the copolymerization of an acrylic acid ester with a chlorine-containing monomer such as a minor amount of chloroethyl vinyl ether, vinyl chloride, or dichloro difluoro ethylene or with acrylonitrile, ethylene or styrene can likewise be used. Polyester-urethanes can also be usefully employed; they are formed by the reaction of an organic diisocyanate compound with a hydroxyl containing polyester reaction product of a dibasic acid and a glycol and cross-linked by means of a polyfunctional hydroxyl or polyhydroxy compound. The silicone rubbers can also be employed. Mixtures of the foregoing elastomers can also be used. Elastomeric materials other than those specifically mentioned above are also useful.

In reinforcing elastomeric materials, a minor amount of the treated halogen-free pigment of the present invention is generally used with a major amount of the elastomeric material. Preferably, in order to obtain the best results an elastomeric composition will contain from about 25 to 45% by weight of the pigment of this invention to from about 75 to 55% by weight of the elastomer, exclusive of other compounding ingredients.

Appropriate compounding ingredients such as other fillers, processing aids, accelerators, vulcanizing agents, curing agents, cross-linking agents, stabilizers, retarders, plasticizers, anti-oxidants, resins, dyes, color pigments, fungicides, and so forth may be employed with the elastomeric and other compositions.

For the purposes of the present invention it is to be understood that the word "curing" in the specification and claims is intended to cover vulcanizing, cross-linking, condensing, fusing or other treatment of the elastomer by which it, whether a conjugated diene, polyester urethane, carboxyl containing polymer, acrylate, vinyl or other elastomer or organic polymer, is converted, under the action of heat, light, or vulcanizing, cross-linking, condensing and/or other agent, into a useful material as is well known to those skilled in the art. "Curing" is also intended to cover the method of only heating those elastomers which soften on heating and harden or toughen on cooling as well as the method employing elastomers which vulcanize, cross-link, etc., at room temperature and below.

The products of the present invention will find utility as a filler or reinforcing pigment in elastomeric compositions for tire treads, white sidewalls of tires, V-belts, gloves, shoe soles, heels, printing rollers, cutless bearings and wherever it is desired to reinforce an elastomer with a light colored to white solid silicon monoxide derivative. It is noteworthy that the use of the halogen-free pigment described herein, particularly in the form of fibers, not only affords good reinforcing properties to rubbery materials comparable to those imparted by carbon black compounds but also permits the obtainment of light colored to white elastomeric materials. Since the pigment obtained according to the present invention has little covering power, elastomeric compositions reinforced with such pigments can be pigmented or dyed to provide colored elastomeric materials which cannot be obtained when carbon black is used and which can not be obtained to any degree with the original brown monox. Since the pigment of the present invention has the same index of refraction as benzene, for it disappears in benzene when added thereto, or as the elastomeric material in which incorporated, it does not tend to adversely color the elastomer as would the original brown monox or as would an opaque pigment such as carbon black nor tend to color the elastomer without reinforcing it as does titanium dioxide. Rather, the pigments produced by the methods disclosed herein are somewhat translucent and accordingly can be combined with various organic and inorganic color pigments such as phthalocyanine blue, phthalocyane green, chrome red, chrome yellow, titanium dioxide, ultramarine blue, and the like in minor amounts to give colored, reinforced elastomeric products of great utility. It is only necessary to use a very minor amount of the coloring pigment so that the reinforcing properties of the new pigment are not lost.

The following examples will serve to illustrate the invention with more particularity to those skilled in the art:

*Example I*

Monox was prepared by reacting sand and anthracite coal by means of an arc in an arc furnace to produce a mixture of SiO and CO gas. The SiO gas in the mixture was condensed by contacting it without substantial turbulence with a mixture of commercial (oil pump) nitrogen gas containing about 1% by volume of ammonia. The condensate $(SiO_2)_x \cdot (Si)_y$, which was brown, particulate or finely divided, solid and substantially fibrous monox, contained about 4.07% by weight of nitrogen and 0.07% by weight of chlorine, apparently from the starting materials, laboratory atmosphere, etc. About 30 grams of this brown monox were then halogenated in a stream of anhydrous chlorine gas at 800° C. for about one hour to remove the silicon as crude silicon tetrachloride and to provide a white, amorphous $SiO_2$ containing on analysis about 2.1% chlorine and 4.4% by weight of nitrogen (Kjeldahl) and having essentially the same physical form as the original monox, that is, being substantially fibrous and particulate although apparently some of the non-fibrous particles may have been removed. This chlorinated monox product was then placed in a quartz tube having one end connected to a tank of anhydrous $NH_3$ and the other end connected to an ice cooled receiver which was in turn connected to a hood. The valve in the tank was turned on to permit the $NH_3$ gas to pass through the chlorinated monox product and the tube was heated to about 800° C. The $NH_3$ gas was passed through the tube for about an hour and in an amount sufficient to provide an excess over that required to theoretically react with the chlorine contained in the product. During the run, ammonium chloride collected in the ice cooled receiver and excess $NH_3$ and other gaseous decomposition and reaction products passed out the hood. The product at the end of the run was still white, amorphous $SiO_2$ and exhibited under the electron microscope the same fibrous structure as the original brown and chlorinated monox since the temperatures employed had not caused sintering of the fibers. It was analyzed and shown to contain 6.4% by weight of nitrogen (Kjeldahl analysis) and 0.2% chlorine. At the end of the $NH_3$ treatment step the white, fibrous silica product had lost 1.90% by weight of chlorine or had lost 90% of the chlorine contained at the end of the chlorination step or of the 2.13% by weight chlorine added during the chlorination step, it had lost 2.00% by weight of chlorine or 94% of the chlorine added by chlorination. Continued treatment with $NH_3$ at the temperature shown reduced the chlorine content even further until the silica was considered free of chlorine since it was not readily detected by conventional analytical methods.

*Example II*

This example was similar to Example I, above, except that ethyl amine, $C_2H_5NH_2$, in gaseous form was used in place of $NH_3$ and the reaction temperature was about 490° C. The silica product produced was essentially the same as that shown in Example I. However, ethylamine hydrochloride was obtained instead of $NH_4Cl$ and the silica contained a minor amount of the amine as

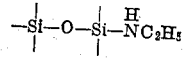

This example shows that amines, such as organic amines, can be used in the practice of the method of the present invention to remove halogen from halogenated monox.

*Example III*

60 parts of the substantially fibrous, white, particulate, amorphous silica of Example I, above, containing 6.4% nitrogen and 0.2% chlorine were mixed at 330° F. for fifteen minutes on a rubber mill with 100 parts of natural rubber, 0.4 part of dianilino methane, and 0.2 part of sulfur. At the end of the mixing period the stock was cooled and mill mixed at 160° F. with 5 parts of zinc oxide, 1½ parts of stearic acid, 1 part of pine oil, 1 part of phenylbetanaphthylamine, 1 part of didodecylamine, 1 part of benzothiazyl disulfide and 3 parts of sulfur. All parts were by weight. Samples of the mixed stock were then placed in molds and vulcanized for varying periods of time at 280° F. to make light colored vulcanizates. The vulcanizates were light colored instead of white since the rubber itself was not white. The vulcanizates were then tested and the results obtained on test are shown below:

| Cure time, Mins. | 300% Modulus | Tensile Strength, p. s. i. | Elongation at break, percent |
|---|---|---|---|
| 10 |  | 800 | 500 |
| 20 | 310 | 1,350 | 490 |
| 40 | 600 | 1,750 | 425 |
| 60 | 950 | 2,300 | 450 |
| 80 | 1,300 | 2,550 | 450 |
|  | 1,450 |  |  |

The results show that the new pigment of the present invention will reinforce rubber to provide light colored vulcanized rubbers exhibiting good physical properties.

In summary, the present invention teaches that light colored to white silicon and oxygen containing fibrous and/or nonfibrous pigments may be obtained by the treatment of halogenated monox with a nitrogen compound to remove all or essentially all of the halogen contained in the halogenated monox. The small amount of halogen which may be retained in such products is so insignificant that it has no adverse effect on materials with which compounded. The resulting product exhibits the same structure and particle size as the halogenated monox starting material or original brown monox, may have a higher surface area than the original brown monox, may contain a minor amount of bound nitrogen generally chemically equivalent to the halogen replaced, and will be substantially amorphous silica. The products produced by the method of the present invention will have great utility as pigments which not only reinforce elastomeric and/or organic polymeric materials but also permit the obtainment of light to white and even variously colored elastomeric and polymeric materials.

What is claimed is:

1. The method comprising treating light colored to white, particulate, solid material comprising amorphous silica containing halogen in an amount not in excess of about 3% by weight with a nitrogen compound having active hydrogen and in an amount and at a temperature sufficient to replace essentially all of the halogen of said silica with a residue of said compound attached to said silica through nitrogen and without causing sintering of said silica.

2. The method comprising treating light colored to white, particulate, solid material comprising amorphous silica containing halogen in an amount not in excess of about 3% by weight with a gaseous nitrogen compound having active hydrogen and in an amount and at a temperature up to about 1100° C. to remove essentially all of the halogen from said silica and to leave a residue of said nitrogent compound attached through nitrogen to said silica.

3. The method comprising treating white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica, to thereby remove essentially all of said halogen compound from said silica and to replace said halogen of said silica with a residue of said nitrogen compound attached to said silica through nitrogen.

4. The method according to claim 3 in which said halogen is chlorine.

5. The method according to claim 4 in which said nitrogen compound is ammonia.

6. The method according to claim 4 in which said nitrogen compound is methylamine.

7. The method according to claim 4 in which said nitrogen compound is ethylamine.

8. The method according to claim 4 in which said nitrogen compound is propylamine.

9. The method according to claim 4 in which said nitrogen compound is butylamine.

10. A light colored to white, particulate, solid, amorphous silica containing a minor amount by weight of nitrogen and obtained by treating a light colored to white, particulate, solid material comprising amorphous silica containing halogen in an amount not in excess of about 3% by weight with a nitrogen compound having active hydrogen and in an amount and at a temperature sufficient to replace essentially all of the halogen of said silica with a residue of said compound attached to said silica through nitrogen and without causing sintering of said silica.

11. A white, substantially fibrous, particulate, solid, amorphous silica containing a minor amount of nitrogen and obtained by treating a white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica, to thereby remove essentially all of said halogen compound from said silica and to replace said halogen of said silica with a residue of said nitrogen compound attached to said silica through nitrogen.

12. The method which comprises mixing a major amount of an organic polymeric composition with a minor amount of a light colored to white, particulate, solid, amorphous silica containing a minor amount of nitrogen and curing the same, said silica being the product obtained by treating a light colored to white, particulate, solid material comprising amorphous silica containing halogen in an amount not in excess of about 3% by weight with a nitrogen compound having active hydrogen and in an amount and at a temperature sufficient to replace essentially all of the halogen of said silica with a residue of said compound attached to said silica through nitrogen and without causing sintering of said silica.

13. The method which comprises mixing a major amount of a curable elastomeric polymer of an open chain conjugated diene having from 4 to 8 carbon atoms and a minor amount of a white, substantially fibrous, particulate, solid, amorphous silica containing a minor amount of nitrogen and curing the same, said silica being the product obtained by treating a white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica, to thereby remove essentially all of said halogen compound from said silica and to replace said halogen of said silica with a residue of said nitrogen compound attached to said silica through nitrogen.

14. The method according to claim 13 in which said polymer comprises natural rubber.

15. The method according to claim 13 in which said polymer comprises a copolymer of a major amount of butadiene-1,3 and a minor amount of styrene.

16. A cured composition comprising a major amount of an organic polymeric composition and a minor amount of a light colored to white, particulate, solid, amorphous silica containing a minor amount of nitrogen, said silica being the product obtained by treating a light colored to white, particulate, solid material comprising amorphous silica containing halogen in an amount not in excess of about 3% by weight with a nitrogen compound having active hydrogen and in an amount and at a temperature sufficient to replace essentially all of the halogen of said silica with a residue of said compound attached to said silica through nitrogen and without causing sintering of said silica.

17. A cured composition comprising a major amount of an elastomeric polymer of an open chain conjugated diene having from 4 to 8 carbon atoms and a minor amount of a white, substantially fibrous, particulate, solid, amorphous silica containing a minor amount of nitrogen, said silica being the product obtained by treating a white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said compound with essentially all of said halogen in said silica to thereby remove essentially all of said halogen compound from said silica and to replace said halogen of said silica with a residue of said nitrogen compound attached to said silica through nitrogen.

18. A cured composition according to claim 17 in which said polymer comprises natural rubber.

19. A cured composition according to claim 17 in which said polymer comprises a copolymer of a major amount of butadiene-1,3 and a minor amount of styrene.

20. The method comprising treating light colored to white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. sufficient to form a gaseous halogen compound with essentially all of said halogen in said silica, to thereby remove essentially all of said halogen compound from said silica and to replace said halogen of said silica with a residue of said nitrogen compound attached to said silica through nitrogen, the fibers of said substantially fibrous silica having a ratio of length to width of at least about 10:1 to 50:1, an average length of at least about 50 to 600 millimicrons and a surface area of about 60 to 200 square meters per gram.

21. A light colored to white, substantially fibrous, particulate, solid, amorphous silica containing a minor amount of nitrogen and obtained by treating a white, substantially fibrous, particulate solid material comprising amorphous silica containing halogen in an amount not in excess of about 3% by weight with a nitrogen compound in the gaseous state, said nitrogen compound being used in an amount of a least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica, to thereby remove essentially all of said halogen compound from said silica and to replace said halogen of said silica with a residue of said nitrogen compound attached to said silica through nitrogen, the fibers of said substantially fibrous silica having a ratio of length to width of at least about 10:1 to 50:1, an average length of at least about 50 to 600 millimicrons and a surface area of about 60 to 200 square meters per gram.

22. The method which comprises mixing a major amount of a curable elastomeric polymer of an open chain conjugated diene having from 4 to 8 carbon atoms and a minor amount of a light colored to white, substantially fibrous, particulate, solid, amorphous silica containing a minor amount of nitrogen and curing the same, said silica being the product obtained by treating a white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica, to thereby remove essentially all of said halogen compound from said silica and to replace said halogen of said silica with a residue of said nitrogen compound attached to said silica through nitrogen, the fibers of said substantially fibrous silica having a ratio of length to width of at least about 10:1 to 50:1, an average length of at least about 50 to 600 millimicrons and a surface area of about 60 to 200 square meters per gram.

23. A cured composition comprising a major amount of an elastomeric polymer of an open chain conjugated diene having from 4 to 8 carbon atoms and a minor amount of a light colored to white, substantially fibrous, particulate, solid, amorphous silica containing a minor amount of nitrogen, said silica being the product obtained by treating a white, substantially fibrous, particulate solid material comprising amorphous silica containing halogen in an amount not in excess of about 3% by weight with a nitrogen compound in the gaseous state, said nitrogen compound being used in an amount of at least 2 mols for every mol of halogen contained in said silica, having active hydrogen and being selected from the group consisting of ammonia and the primary and secondary aliphatic, aromatic, and cyclic amines and their substituted and N-substituted derivatives and at a temperature of from about 400 to 800° C. to form a gaseous halogen compound with essentially all of said halogen in said silica to thereby remove essentially all of said halogen compound from said silica and to replace said halogen of said silica with a residue of said nitrogen compound attached to said silica through nitrogen, the fibers of said substantially fibrous silica having a ratio of length to width of at least about 10:1 to 50:1, an average length of at least about 50 to 600 millimicrons and a surface area of about 60 to 200 square meters per gram.

References Cited in the file of this patent

UNITED STATES PATENTS

| | | |
|---|---|---|
| 2,093,106 | Ayers | Sept. 14, 1937 |
| 2,535,036 | Broughton | Dec. 26, 1950 |
| 2,560,043 | Schmidt | July 10, 1951 |
| 2,578,605 | Sears | Dec. 11, 1951 |
| 2,663,650 | Iler | Dec. 22, 1953 |
| 2,692,871 | Pechukas | Oct. 26, 1954 |
| 2,739,904 | Frey | Mar. 27, 1956 |
| 2,757,098 | Berry et al. | July 31, 1956 |